United States Patent
Shah et al.

(10) Patent No.: US 9,743,459 B2
(45) Date of Patent: Aug. 22, 2017

(54) LONG TERM EVOLUTION (LTE) CONNECTED DISCONTINUOUS RECEPTION (CDRX) FOR SINGLE-RADIO HYBRID TUNE AWAY DEVICES

(71) Applicant: QUALCOMM Incorporated, San Diego, CA (US)

(72) Inventors: Chintan Shirish Shah, San Diego, CA (US); Prasad Kadiri, San Diego, CA (US); Deepak Krishnamoorthi, San Diego, CA (US); Nirmal Shekar, Boulder, CO (US); Neelakanta Venkata Seshachalam Chimmapudi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 134 days.

(21) Appl. No.: 14/812,791

(22) Filed: Jul. 29, 2015

(65) Prior Publication Data
US 2016/0037578 A1 Feb. 4, 2016

Related U.S. Application Data

(60) Provisional application No. 62/031,852, filed on Jul. 31, 2014.

(51) Int. Cl.
| | |
|---|---|
| *H04W 76/04* | (2009.01) |
| *H04W 76/02* | (2009.01) |
| *H04W 76/06* | (2009.01) |
| *H04W 88/06* | (2009.01) |

(52) U.S. Cl.
CPC ....... *H04W 76/048* (2013.01); *H04W 76/026* (2013.01); *H04W 76/068* (2013.01); *H04W 88/06* (2013.01)

(58) Field of Classification Search
CPC . H04W 76/048; H04W 76/026; H04W 88/06; H04W 76/068
See application file for complete search history.

(56) References Cited

U.S. PATENT DOCUMENTS

| | | | |
|---|---|---|---|
| 8,315,194 B2 | 11/2012 | Jeong et al. | |
| 8,400,934 B2 | 3/2013 | Digirolamo et al. | |

(Continued)

OTHER PUBLICATIONS

International Search Report and Written Opinion—PCT/US2015/042837—ISA/EPO—Oct. 21, 2015.

*Primary Examiner* — Phuc Tran
(74) *Attorney, Agent, or Firm* — Patterson & Sheridan LLP

(57) ABSTRACT

Certain aspects of the present disclosure relate to techniques and apparatus for optimizing long term evolution (LTE) connected discontinuous reception (CDRX) for single radio hybrid tune away devices. Certain aspects provide a method for wireless communications by a user equipment (UE). The method generally includes entering a DRX mode wherein the UE alternates between an activity period and an inactivity period while connected to a first radio access technology (RAT) network, tuning away from the first RAT network for a tune away period to monitor signals in a second RAT network, determining when an inactivity timer for the DRX mode expires or will expire, and adjusting a value of the inactivity timer based, at least in part, on the determination.

30 Claims, 11 Drawing Sheets

(56) References Cited

U.S. PATENT DOCUMENTS

| | | | |
|---|---|---|---|
| 2010/0118752 A1* | 5/2010 | Suzuki | H04W 76/048 370/311 |
| 2013/0083712 A1 | 4/2013 | Sadek et al. | |
| 2013/0130693 A1* | 5/2013 | Salvador | H04W 48/20 455/437 |
| 2013/0194994 A1 | 8/2013 | Dayal et al. | |
| 2013/0201892 A1 | 8/2013 | Holma et al. | |
| 2013/0267267 A1 | 10/2013 | Mujtaba et al. | |
| 2014/0073366 A1* | 3/2014 | Xing | H04W 24/02 455/458 |
| 2014/0099955 A1 | 4/2014 | Nukala et al. | |
| 2015/0043481 A1 | 2/2015 | Mucke et al. | |
| 2015/0327167 A1* | 11/2015 | Ljung | H04W 76/068 370/311 |

* cited by examiner

LONG TERM EVOLUTION (LTE) CONNECTED DISCONTINUOUS RECEPTION (CDRX) FOR SINGLE-RADIO HYBRID TUNE AWAY DEVICES

CROSS-REFERENCE TO RELATED APPLICATIONS

This application claims benefit of U.S. Provisional Patent Application Ser. No. 62/031,852, filed Jul. 31, 2014, which is herein incorporated by reference in its entirety.

BACKGROUND

Field of the Disclosure

The present disclosure relates generally to wireless communication, and more particularly, to methods and apparatus for long term evolution (LTE) connected discontinuous reception (CDRX) for single-radio hybrid tune away devices.

Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE/LTE-Advanced is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. "LTE" refers generally to LTE and LTE-Advanced (LTE-A). Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide techniques, corresponding apparatus, and program products, for long term evolution (LTE) connected discontinuous reception (CDRX) for single-radio hybrid tune away devices.

Certain aspects of the present disclosure provide a method for wireless communications by a user equipment (UE). The method generally includes entering a DRX mode wherein the UE alternates between an activity period and an inactivity period while connected to a first radio access technology (RAT) network; tuning away from the first RAT network for a tune away period to monitor signals in a second RAT network; determining when an inactivity timer for the DRX mode expires or will expire; and adjusting a value of the inactivity timer based, at least in part, on the determination.

Certain aspects of the present disclosure provide an apparatus for wireless communications by a UE. The apparatus generally includes means for entering a DRX mode wherein the UE alternates between an activity period and an inactivity period while connected to a first RAT network; means for tuning away from the first RAT network for a tune away period to monitor signals in a second RAT network; means for determining when an inactivity timer for the DRX mode expires or will expire; and means for adjusting a value of the inactivity timer based, at least in part, on the determination.

Certain aspects of the present disclosure provide an apparatus for wireless communications by a user equipment (UE). The apparatus generally includes at least one processor configured to enter a DRX mode wherein the UE alternates between an activity period and an inactivity period while connected to a first RAT network, tune away from the first RAT network for a tune away period to monitor signals in a second RAT network, determine when an inactivity timer for the DRX mode expires or will expire, and adjust a value of the inactivity timer based, at least in part, on the determination; and a memory coupled with the at least one processor.

Certain aspects of the present disclosure provide a non-transitory computer-readable medium storing computer executable code. The computer executable code generally includes code for entering a DRX mode wherein a UE alternates between an activity period and an inactivity period while connected to a first RAT network; code for tuning away from the first RAT network for a tune away period to monitor signals in a second RAT network; code for determining when an inactivity timer for the DRX mode expires or will expire; and code for adjusting a value of the inactivity timer based, at least in part, on the determination.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
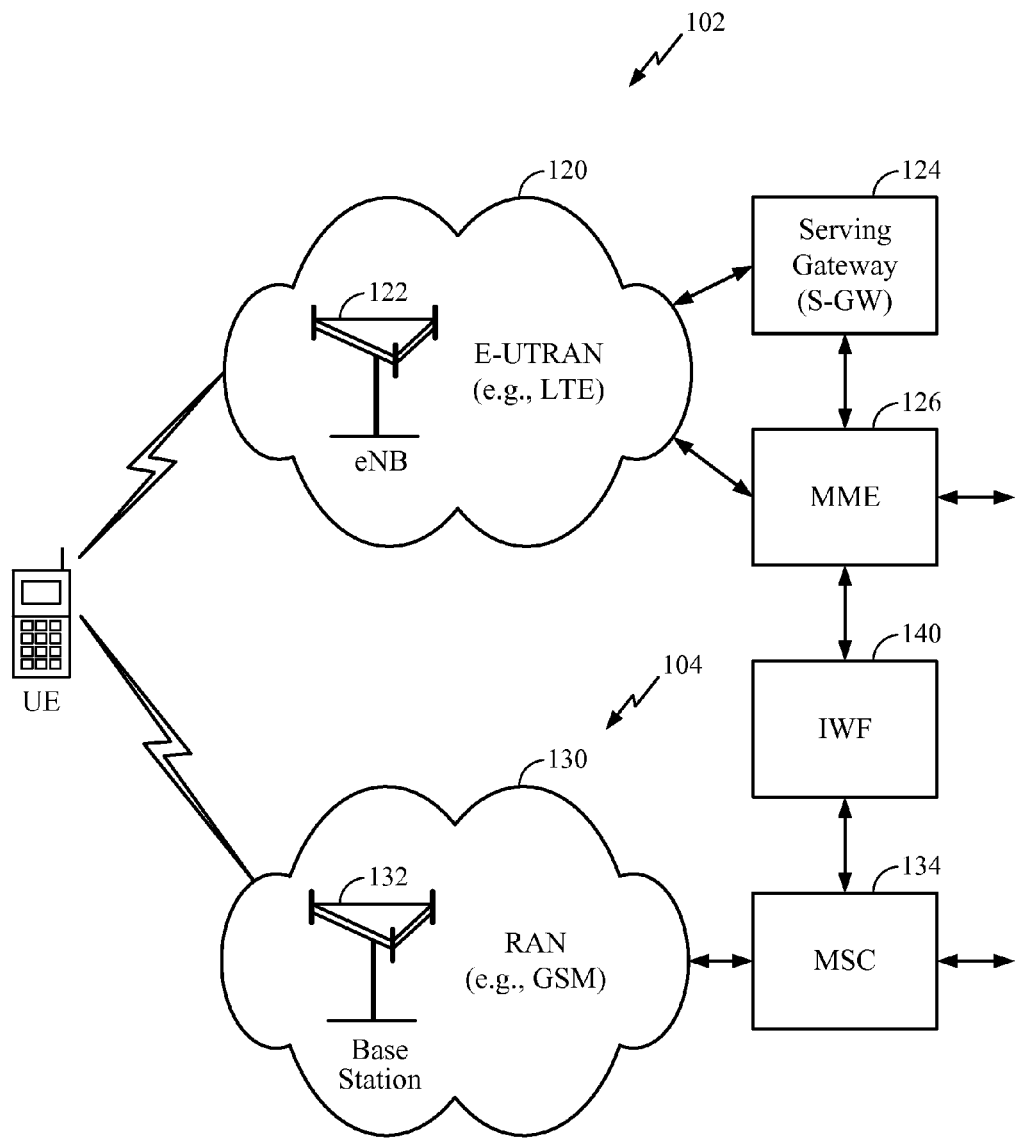
FIG. 1 illustrates an exemplary deployment in which multiple wireless networks have overlapping coverage, in accordance with certain aspects of the present disclosure.

Certain aspects of the present disclosure provide techniques, corresponding apparatus, and program products, for optimization of long term evolution (LTE) connected discontinuous reception (CDRX) for single-radio hybrid tune away devices. For example, if an inactivity timer expires while a device is tuned away from LTE, the inactivity timer may be reset at the end of the tune away gap. Thus, the device may remain awake for a duration after the tune away to monitor for physical downlink control channel (PDCCH) on LTE.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, firmware, routines, subroutines, objects, executables, threads of execution, procedures, functions, etc., whether referred to as software/firmware, middleware, microcode, hardware description language, or otherwise.

Accordingly, in one or more exemplary embodiments, the functions described may be implemented in hardware, software, or combinations thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, PCM (phase change memory), flash memory, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Example Wireless Communication System

FIG. 1 shows an exemplary deployment in which multiple wireless network having overlapping coverage in which aspects of the present disclosure may be performed. For example, UE 110 may a continuous discontinuous reception (CDRX) mode wherein the UE 110 alternates between an activity period and an inactivity period while connected to a first radio access technology (RAT) network such as radio access network (RAN) 120. The UE 110 may tune away from the RAN 120 for a tune away period to monitor signals in a second RAT network such as RAN 130. The UE 110 may determine when an inactivity timer for the DRX mode expires or will expire and the UE 110 may adjust a value of the inactivity time based, at least in part, on the determination.

As shown in FIG. 1 an evolved universal terrestrial radio access network (E-UTRAN) 120 may support LTE and may include a number of evolved Node Bs (eNBs) 122 and other network entities that can support wireless communication for user equipments (UEs). Each eNB may provide communication coverage for a particular geographic area. The term "cell" can refer to a coverage area of an eNB and/or an eNB subsystem serving this coverage area. A serving gateway (S-GW) 124 may communicate with E-UTRAN 120 and may perform various functions such as packet routing and forwarding, mobility anchoring, packet buffering, initiation of network-triggered services, etc. A mobility management entity (MME) 126 may communicate with E-UTRAN 120 and serving gateway 124 and may perform various functions such as mobility management, bearer management, distribution of paging messages, security control, authentication, gateway selection, etc. The network entities in LTE are described in 3GPP TS 36.300, entitled "Evolved Universal Terrestrial Radio Access (E-UTRA) and Evolved Universal Terrestrial Radio Access Network (E-UTRAN); Overall description," which is publicly available.

A radio access network (RAN) 130 may support GSM and may include a number of base stations 132 and other network entities that can support wireless communication for UEs. A mobile switching center (MSC) 134 may communicate with the RAN 130 and may support voice services, provide routing for circuit-switched calls, and perform mobility management for UEs located within the area served by MSC 134. Optionally, an inter-working function (IWF) 140 may facilitate communication between MME 126 and MSC 134 (e.g., for 1×CSFB).

E-UTRAN 120, serving gateway 124, and MME 126 may be part of an LTE network 102. RAN 130 and MSC 134 may be part of a GSM network 104. For simplicity, FIG. 1 shows only some network entities in the LTE network 102 and the GSM network 104. The LTE and GSM networks may also include other network entities that may support various functions and services.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs.

A UE 110 may be stationary or mobile and may also be referred to as a mobile station, a terminal, an access terminal, a subscriber unit, a station, etc. UE 110 may be a cellular phone, a personal digital assistant (PDA), a wireless modem, a wireless communication device, a handheld device, a laptop computer, a cordless phone, a wireless local loop (WLL) station, etc.

Upon power up, UE 110 may search for wireless networks from which it can receive communication services. If more than one wireless network is detected, then a wireless network with the highest priority may be selected to serve UE 110 and may be referred to as the serving network. UE 110 may perform registration with the serving network, if necessary. UE 110 may then operate in a connected mode to actively communicate with the serving network. Alternatively, UE 110 may operate in an idle mode and camp on the serving network if active communication is not required by UE 110.

UE 110 may be located within the coverage of cells of multiple frequencies and/or multiple RATs while in the idle mode. For LTE, UE 110 may select a frequency and a RAT to camp on based on a priority list. This priority list may include a set of frequencies, a RAT associated with each frequency, and a priority of each frequency. For example, the priority list may include three frequencies X, Y and Z. Frequency X may be used for LTE and may have the highest priority, frequency Y may be used for GSM and may have the lowest priority, and frequency Z may also be used for GSM and may have medium priority. In general, the priority list may include any number of frequencies for any set of RATs and may be specific for the UE location. UE 110 may be configured to prefer LTE, when available, by defining the priority list with LTE frequencies at the highest priority and with frequencies for other RATs at lower priorities, e.g., as given by the example above.

UE 110 may operate in the idle mode as follows. UE 110 may identify all frequencies/RATs on which it is able to find a "suitable" cell in a normal scenario or an "acceptable" cell in an emergency scenario, where "suitable" and "acceptable" are specified in the LTE standards. UE 110 may then camp on the frequency/RAT with the highest priority among all identified frequencies/RATs. UE 110 may remain camped on this frequency/RAT until either (i) the frequency/RAT is no longer available at a predetermined threshold or (ii) another frequency/RAT with a higher priority reaches this threshold. This operating behavior for UE 110 in the idle mode is described in 3GPP TS 36.304, entitled "Evolved Universal Terrestrial Radio Access (E-UTRA); User Equipment (UE) procedures in idle mode," which is publicly available.

UE 110 may be able to receive packet-switched (PS) data services from LTE network 102 and may camp on the LTE network while in the idle mode. LTE network 102 may have limited or no support for voice-over-Internet protocol (VoIP), which may often be the case for early deployments of LTE networks. Due to the limited VoIP support, UE 110 may be transferred to another wireless network of another RAT for voice calls. This transfer may be referred to as circuit-switched (CS) fallback. UE 110 may be transferred to a RAT that can support voice service such as 1×RTT, WCDMA, GSM, etc. For call origination with CS fallback, UE 110 may initially become connected to a wireless network of a source RAT (e.g., LTE) that may not support voice service. The UE may originate a voice call with this wireless network and may be transferred through higher-layer signaling to another wireless network of a target RAT that can support the voice call. The higher-layer signaling to transfer the UE to the target RAT may be for various procedures, e.g., connection release with redirection, PS handover, etc.

Figure 2:
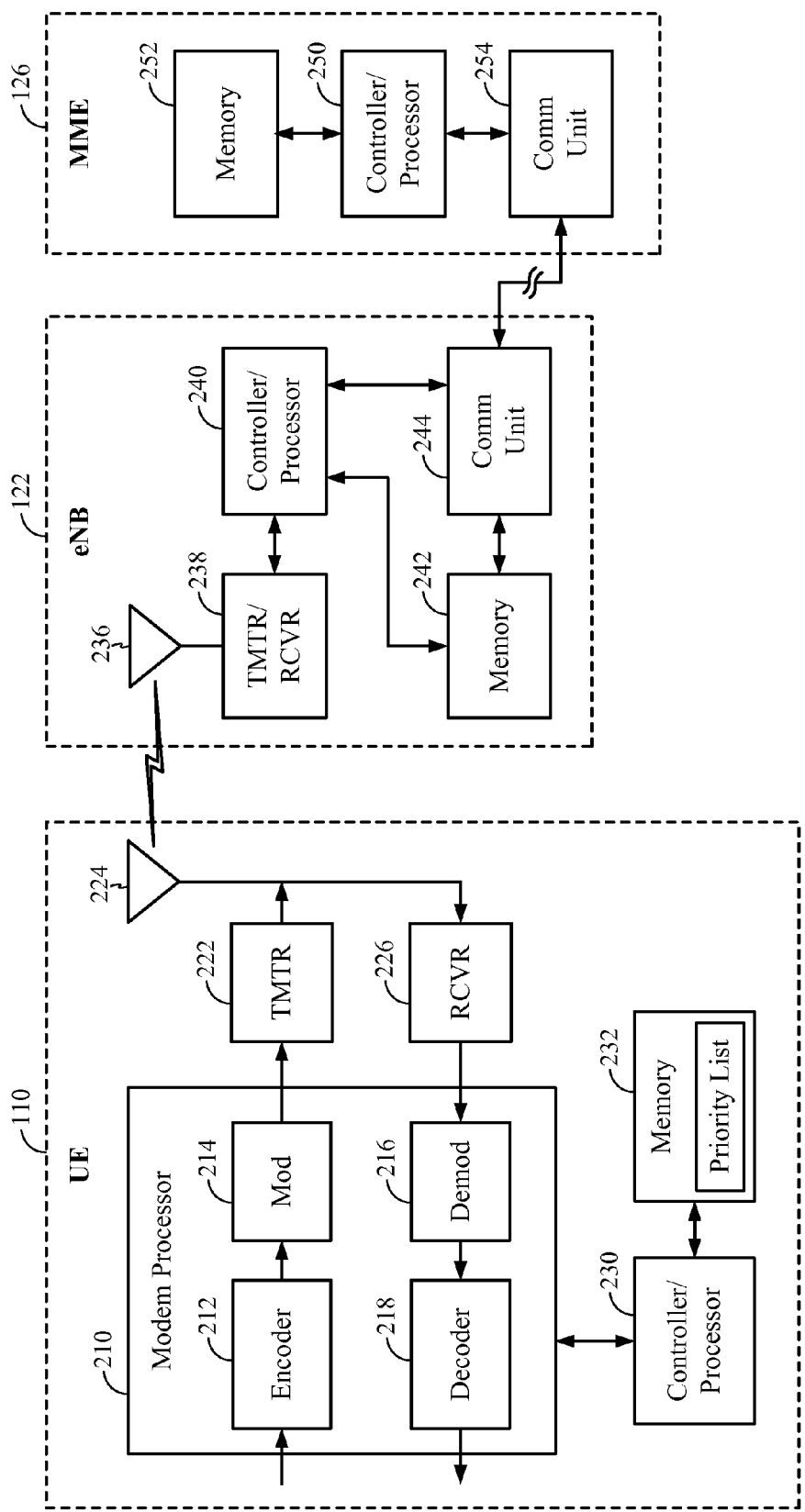
FIG. 2 illustrates a block diagram of a user equipment (UE) and other network entities, in accordance with certain aspects of the present disclosure.

FIG. 2 shows a block diagram of a design of UE 110, eNB 122, and MME 126 in FIG. 1. At UE 110, an encoder 212 may receive traffic data and signaling messages to be sent on the uplink. Encoder 212 may process (e.g., format, encode, and interleave) the traffic data and signaling messages. A modulator (Mod) 214 may further process (e.g., symbol map and modulate) the encoded traffic data and signaling messages and provide output samples. A transmitter (TMTR) 222 may condition (e.g., convert to analog, filter, amplify, and frequency upconvert) the output samples and generate an uplink signal, which may be transmitted via an antenna 224 to eNB 122.

On the downlink, antenna 224 may receive downlink signals transmitted by eNB 122 and/or other eNBs/base stations. A receiver (RCVR) 226 may condition (e.g., filter, amplify, frequency downconvert, and digitize) the received signal from antenna 224 and provide input samples. A demodulator (Demod) 216 may process (e.g., demodulate) the input samples and provide symbol estimates. A decoder 218 may process (e.g., deinterleave and decode) the symbol estimates and provide decoded data and signaling messages sent to UE 110. Encoder 212, modulator 214, demodulator 216, and decoder 218 may be implemented by a modem processor 210. These units may perform processing in accordance with the RAT (e.g., LTE, 1×RTT, etc.) used by the wireless network with which UE 110 is in communication.

A controller/processor 230 may direct the operation at UE 110. Controller/processor 230 may also perform or direct other processes for the techniques described herein. Controller/processor 230 may also perform or direct the processing by UE 110 in FIG. 8. Memory 232 may store program codes and data for UE 110. Memory 232 may also store a priority list and configuration information.

At eNB 122, a transmitter/receiver 238 may support radio communication with UE 110 and other UEs. A controller/processor 240 may perform various functions for communication with the UEs. On the uplink, the uplink signal from UE 110 may be received via an antenna 236, conditioned by receiver 238, and further processed by controller/processor 240 to recover the traffic data and signaling messages sent by UE 110. On the downlink, traffic data and signaling messages may be processed by controller/processor 240 and conditioned by transmitter 238 to generate a downlink signal, which may be transmitted via antenna 236 to UE 110 and other UEs. Controller/processor 240 may also perform or direct other processes for the techniques described herein. Controller/processor 240 may also perform or direct the processing by eNB 122. Memory 242 may store program codes and data for the base station. A communication (Comm) unit 244 may support communication with MME 126 and/or other network entities.

At MME 126, a controller/processor 250 may perform various functions to support communication services for UEs. Controller/processor 250 may also perform or direct the processing by MME 126. Memory 252 may store program codes and data for MME 126. A communication unit 254 may support communication with other network entities.

According to aspects, as will be described in more details herein, the UE 110 may support communications with multiple RATs (e.g., concurrent RATs) (CRAT). The CRAT UE may share uplink transmissions between two RATs, for example, in terms of TDM. The CRAT UE may support dual receiving of downlink transmissions. According to aspects, as will be described in more details herein, the UE 110 may be a single radio device. Such UE may support communications with multiple RATs.

FIG. 2 shows simplified designs of UE 110, eNB 122, and MME 126. In general, each entity may include any number of transmitters, receivers, processors, controllers, memories, communication units, etc. Other network entities may also be implemented in similar manner.

For example, UE 110 of FIG. 2 comprises a single TMTR 222 and a single RCVR 226. According to aspects, UE 110 may comprise a single TMTR and a dual RCVR, and therefore may support CRAT. For example, UE 110 may share uplink transmissions between two RATs and may support dual downlink receiving. According to aspects, the UE may support CRAT with LTE and GMS or CDMA2000 1×RTT.

One challenge with utilizing a single transmitter for multiple RAT communications is that, at times, there may be conflicts between scheduled uplink transmissions in both RATs. While the conflict may occur with an uplink transmission, the uplink transmission itself may result from a scheduled downlink transmission. For example, for scheduled LTE downlink transmissions, a UE may need to transmit an ACK in uplink to confirm it received the data. In other words, it is possible that a UE may be scheduled for uplink transmission in both RATs during given a transmission period.

In some cases, Rx with multiple RATs (e.g., concurrent Rx) may also be achieved. For example, two Rx (e.g., two separate receive chains with two separate antennas) may be shared by GSM or CDMA2000 1×RTT, and LTE in a manner similar to Simultaneous Hybrid Dual Receivers (SHDR). When GSM or CDMA2000 1×RTT receiving is not needed, LTE may use two receive chains for multiple input multiple output (MIMO) and diversity. When GSM or CDMA2000 1×RTT receiving is needed, one Rx may be tuned to GSM or CDMA2000 1×RTT, and the remaining Rx may be used for LTE receiving. In some embodiments, since only one receive chain is being used for LTE, the UE may report a fake channel quality indictor (CQI) to avoid eNB scheduling for dual layer transmission.

Similarly, a challenge that exists with utilizing a single receiver for communications with multiple RATs is that, at times, there may be conflicts between scheduled downlink transmissions in both RATs. UE 110 shown in FIG. 2 comprises a single TMTR 222 and single RCVR 226, and therefore may only communicate with a single RAT at any given time, for example, LTE network 102 or GSM network 104 shown in FIG. 1.

In a single-radio device capable of communicating over multiple RATs (e.g., 1×RTT, GSM, and LTE), such as the UE 110, the device occasionally tunes its radio to each supported RAT and listens for communications (e.g., pages) from a BS of that RAT. In order to detect and receive a page or other communication, the device may tune its radio to a RAT for a period of time (e.g., 80 ms). The device may tune its radio to a particular RAT periodically, with the period (e.g., 1.28 sec, 2.56 sec, etc.) configurable by the network via RRC signaling, for example.

Figure 3:
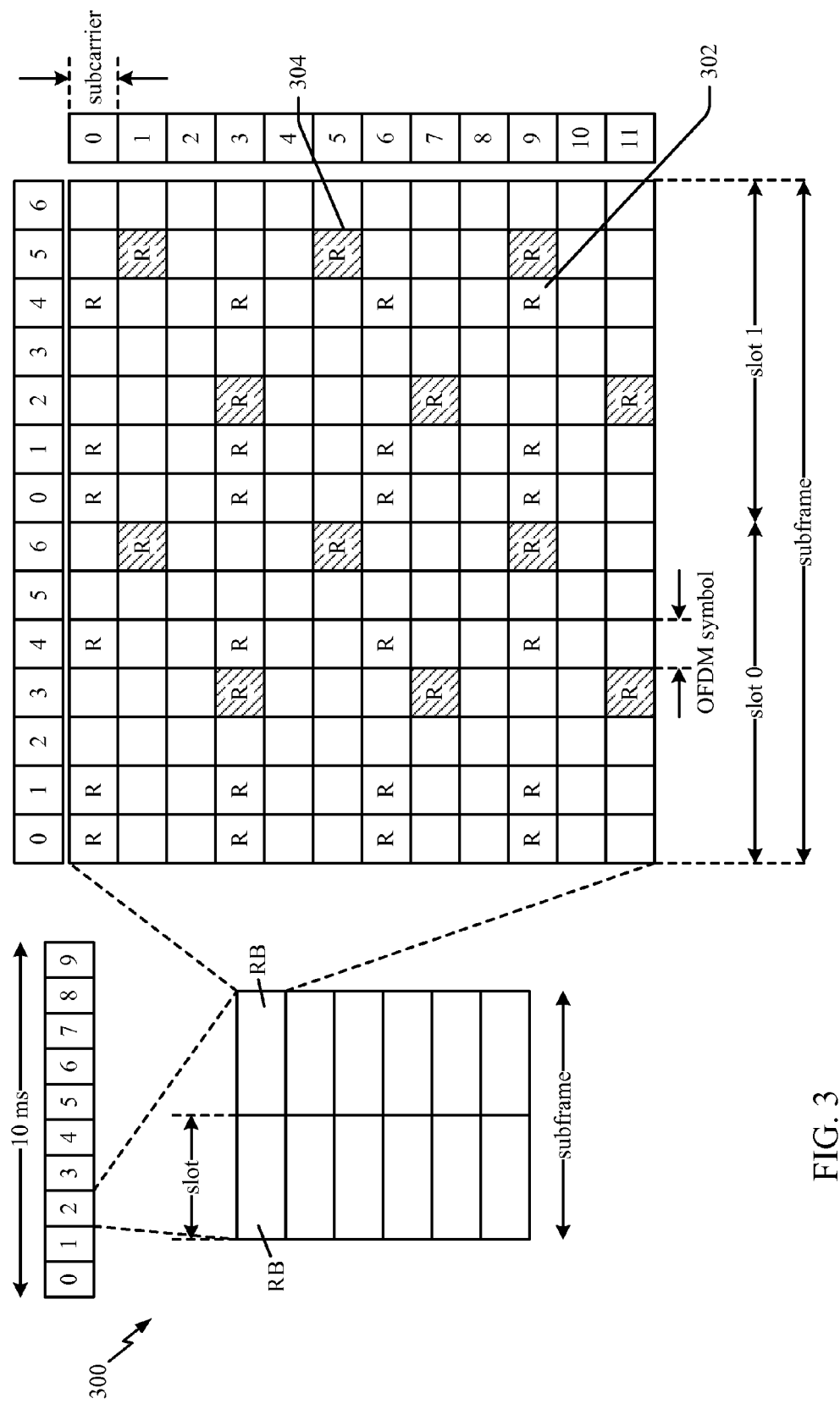
FIG. 3 is a diagram illustrating an example of a downlink frame structure in LTE, in accordance with certain aspects of the disclosure.

FIG. 3 is a diagram 300 illustrating an example of a DL frame structure in LTE. A frame (10 ms) may be divided into 10 equally sized sub-frames with indices of 0 through 9. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, R 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP). The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe. The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH. In aspects of the present methods and apparatus, a subframe may include more than one PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 4:
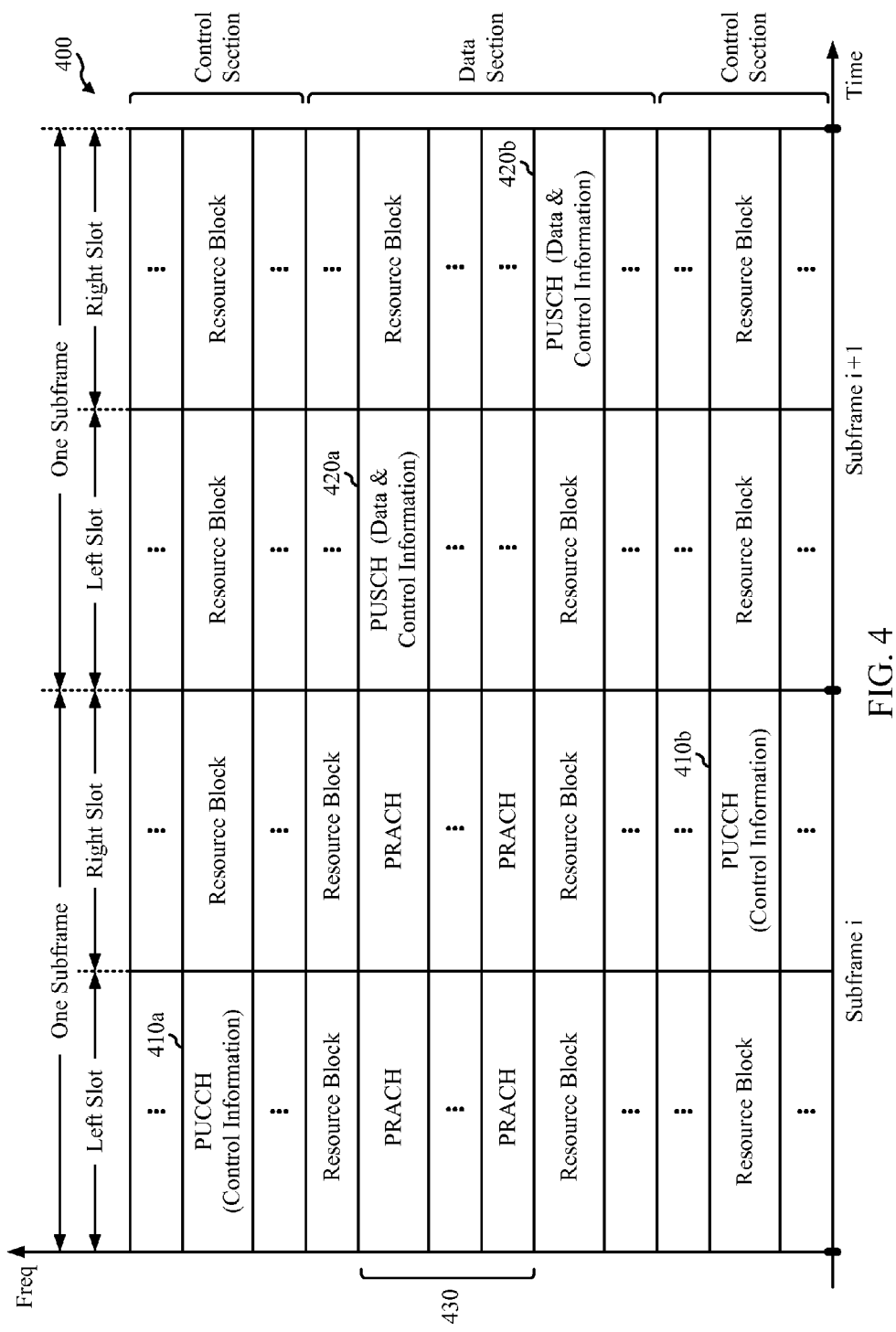
FIG. 4 is a diagram illustrating an example of an uplink frame structure in long term evolution (LTE), in accordance with certain aspects of the disclosure.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
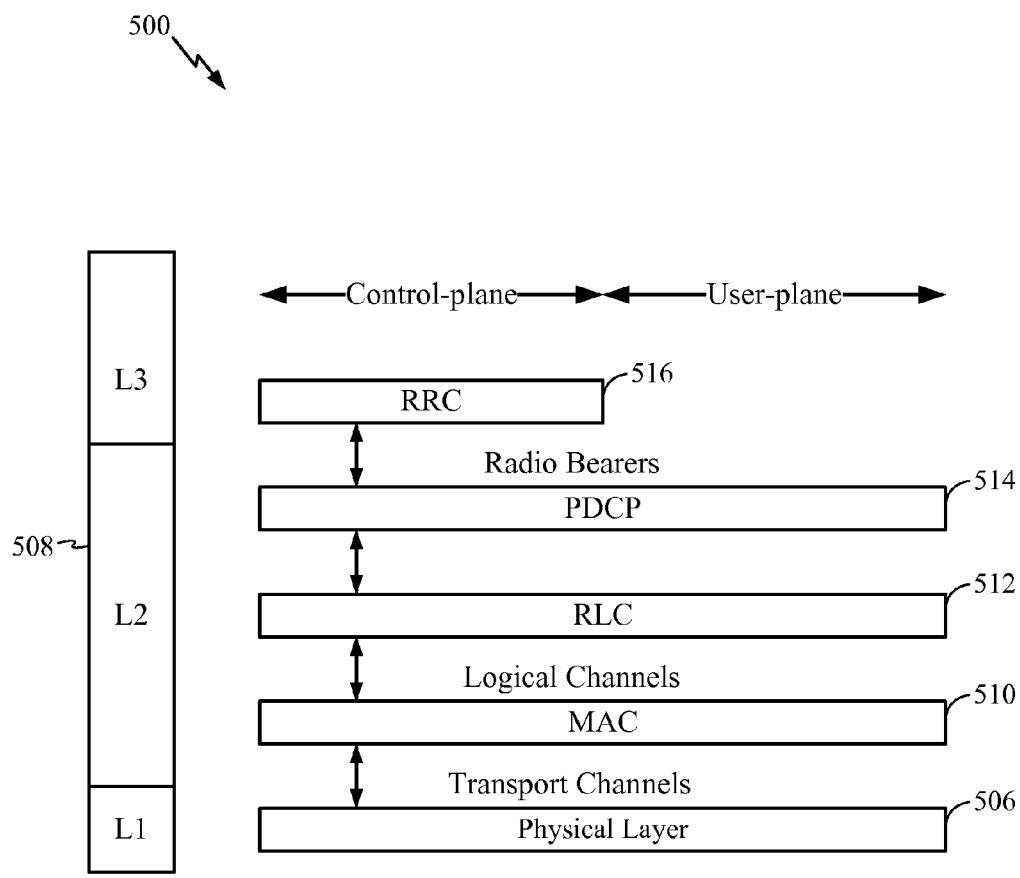
FIG. 5 is a diagram illustrating an example of a radio protocol architecture for the user and control plane, in accordance with certain aspects of the disclosure.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
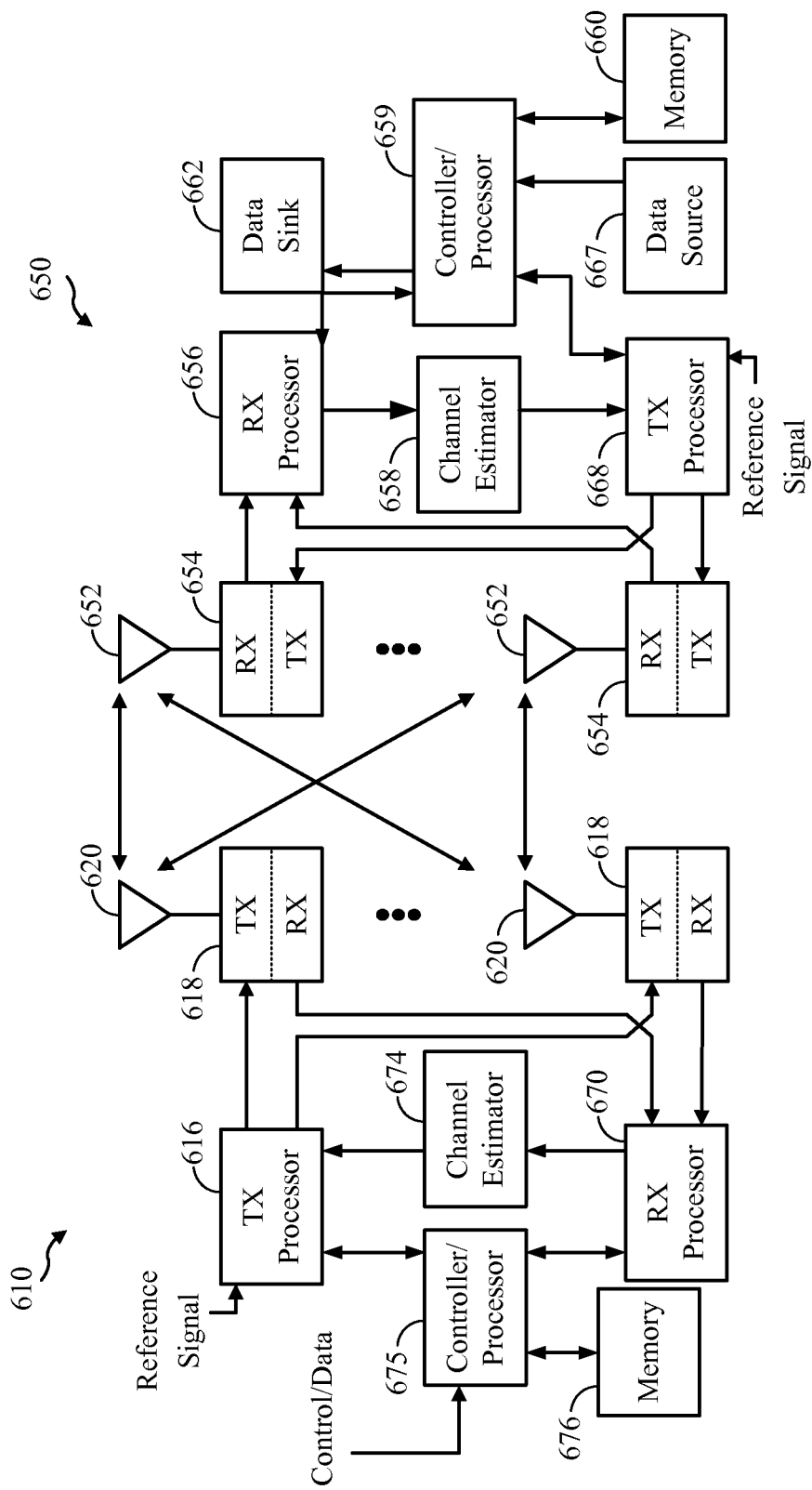
FIG. 6 is a diagram illustrating an example of an evolved Node B and user equipment in an access network, in accordance with certain aspects of the disclosure.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations. The controllers/processors 675, 659 may direct the operation at the eNB 610 and the UE 650, respectively. The controller/processor 659 and/or other processors and modules at the UE 650 may perform or direct operations for example operations 1000 in FIG. 10, and/or other processes for the techniques described herein, for example. The controller/processor 675 and/or other processors and modules at the eNB 610 may perform or direct operations and/or other processes for the techniques described herein, for example. In aspects, one or more of any of the components shown in FIG. 6 may be employed to perform example operations 1000 and/or other processes for the techniques described herein.

Example CDRX Mode Operations

With the ever-increasing popularity of smart phones, there are many new challenges for the design of wireless systems, including power consumption and signaling demands. For example, instead of being awake only for the typically small percentage of talk time, smart phones are awake much more often. Applications, such as e-mail or social networking, may send "keep-alive" message every 20 to 30 minutes, for example. Such applications often use many small and bursty data transmissions that may entail a significantly larger amount of control signaling. Some system level evaluations have identified control channel limitations in addition to traffic channel limitations.

Connected Discontinuous Reception (CDRX) is a technique used in wireless communication to reduce power consumption, thereby conserving the battery of the mobile device. The mobile device and the network negotiate phases in which data transfer occurs, where the mobile device's receiver is turned on (e.g., in a connected state), referred to as an on duration of the CDRX cycle. During other times, referred to as off durations, the mobile device turns its receiver off and enters a low power state. There is usually a function designed into the protocol for this purpose. For example, the transmission may be structured in slots with headers containing address details so that devices may listen to these headers in each slot to decide whether the transmission is relevant to the devices or not. In this case, the receiver may only be active at the beginning of each slot to receive the header, conserving battery life. Other DRX techniques include polling, whereby the device is placed into standby for a given amount of time and then a beacon is sent by the base station periodically to indicate if there is any data waiting for it.

In long term evolution (LTE) network, CDRX is controlled by the radio resource control (RRC) protocol. RRC signaling sets a cycle where the user equipment's (UE) receiver is operational for a certain period, typically when all the scheduling and paging information is transmitted. The serving evolved Node B (eNB) may know that the UE's receiver is completely turned off and is not able to receive anything. Except when in CDRX, the UE's receiver may most likely be active to monitor a Physical Downlink Control Channel (PDCCH) to identify downlink data. During CDRX, the UE's receiver may be turned off.

There are two RRC states for a UE: (1) RRC_Idle where the radio is not active, but an identifier (ID) is assigned to the UE and tracked by the network; and (2) RRC_Connected with active radio operation having context in the eNB. In LTE, CDRX also applies to the RRC_Idle state with a longer cycle time than active mode.

In LTE, the start of CDRX may be determined by a parameter named longDRX-CycleStartOffset that is set for each UE by the network via RRC signaling. The longDRX-CycleStartOffset parameter is used (e.g. in a calculation) by the UE to determine in which subframe the UE's on duration should commence. For example, a UE may be configured with a CDRX cycle length of 1280 subframes (e.g., 1280 ms) and a longDRX-CycleStartOffset of 511. In the example, the UE may begin its on duration whenever (SFN*10+subFN) mod 1280=511, where SFN is the system frame number, subFN is the subframe index number, and mod is the modulo operation. A drx-Inactivity-Timer specifies the number of consecutive PDCCH-subframe(s) for which the UE should be active after successfully decoding a PDCCH indicating a new transmission (UL or DL). This drx-Inactivity-Timer may be restarted upon receiving PDCCH for a new transmission (UL or DL). Upon the expiry of this timer (after not receiving a PDCCH for a new transmission for the specified number of subframes) the you may go to DRX OFF) mode. An onDurationTimer specifies the number of consecutive PDCCH-subframe(s) at the beginning of each DRX Cycle (DRX ON). In other words, the onDurationTimer is the number of subframes over which the UE may read PDCCH during every DRX cycle before entering the power saving mode (DRX OFF)

Example LTE CDRX for Single-Radio Hybrid Tune Away Devices

Devices having a single radio may be able to operate in multiple radio access technology (RAT) networks by tuning away from one RAT network to operate in another RAT network and tuning back to the first RAT network to operate in that RAT network. For example, a user equipment (UE) (e.g., UE 110), such as single radio long term evolution (SRLTE) UE, may be connected to an LTE network (e.g., LTE network 102).

The SRLTE device may perform a tune away from the LTE network and use radio frequency (RF) resources to conduct paging and/or channel monitoring in another RAT (e.g., GSM network 104, 1×RTT, TD-SCDMA, or other 3G technologies). The UE may tune away to the other RAT network for a period referred to as a tune away gap. After the tune away gap, the UE may tune back to the LTE network.

During the tune away gap, while the UE is tuned to the second RAT network, the UE will miss any signaling or data scheduled by the e NodeB (e.g., eNB 122) of the LTE network during that period. As discussed above, in the LTE network, the UE may operate in a discontinuous reception (DRX) mode. For example, the UE may operate in the connected DRX mode (CDRX) where the UE remains in a connected state (e.g., radio resource control (RRC) connected) to the eNB.

Figure 7:
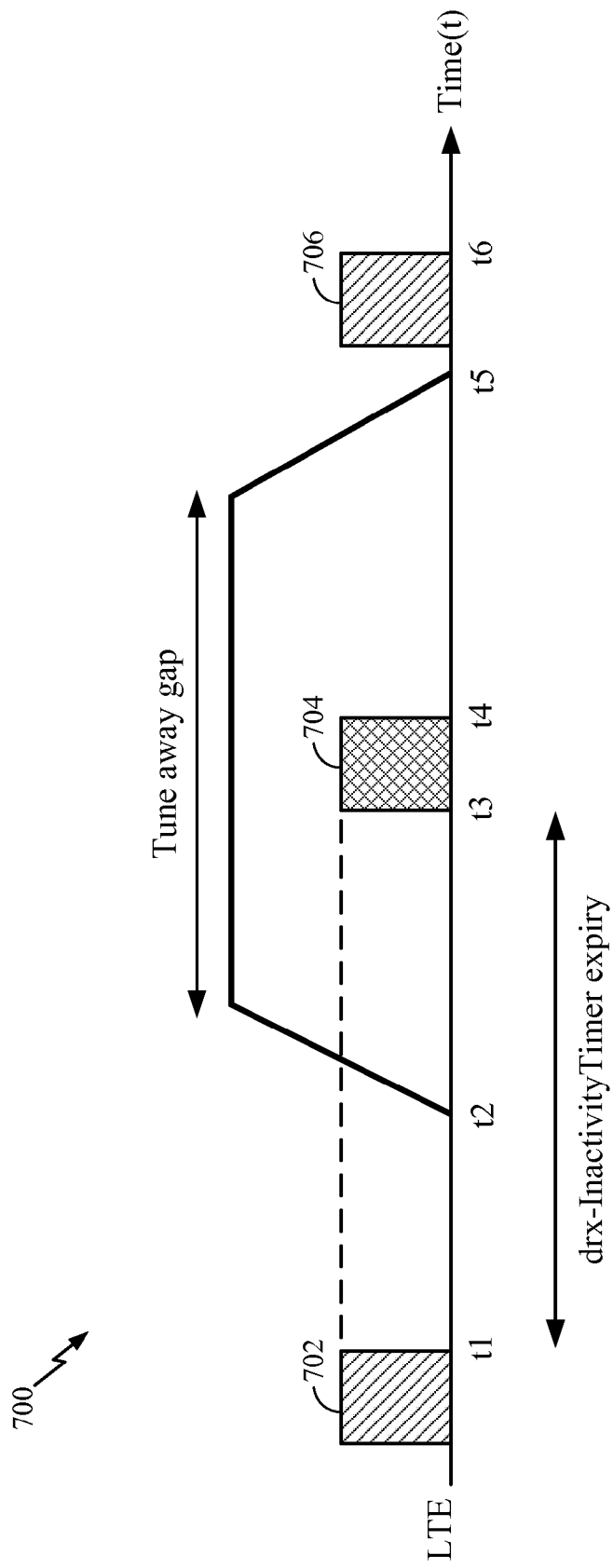
FIG. 7 is an example timeline illustrating a tune away during an LTE connected discontinuous reception (CDRX) cycle which may result in LTE data throughput loss.

Thus, in some cases, the UE may tune away from the LTE network while operating in the CDRX mode. FIG. 7 is an example timeline 700 illustrating tune away by a UE away during an LTE CDRX cycle which may result in LTE data throughput loss.

As shown in FIG. 7, in CDRX mode, during the ON duration of the CDRX cycle, an inactivity timer (e.g., the drx-inactivity timer) be initiated, at t1, when the UE successful decodes a physical downlink control channel (PDCCH) 702 in the LTE network. In some cases, if the UE tunes away from the LTE network, at t2, after decoding the PDCCH 702, the inactivity time may expire, at t3, during the tune away gap.

At expiry of the inactivity timer, the UE monitors for a reliable one subframe PDCCH decode (e.g., PDCCH 704) in order for the UE to transition into the CDRX OFF state. However, because the UE is tuned away from the LTE network, the UE fails to decode any PDCCH subframe and, as a result, the UE does not enter into the CDRX OFF state.

For example, as shown in FIG. 7, at t4, the UE misses the PDCCH 704 while during the tune away gap. Instead, the UE continues monitoring for a successful PDCCH decode to trigger transition into the CDRX OFF state. Thus, in certain cases, the tune away may prevent the UE from going to sleep.

Shortly after the tune away gap ends, the UE tunes back to the LTE network, at t5. Once tuned back to the LTE network, the UE can then successfully decode a PDCCH subframe 706, at t6. After successful PDCCH decoding, the UE enters into the CDRX OFF state in which the UE ignores (e.g., does not read) any PDCCH grants allocated for that device.

Since the UE ignores the PDCCH grants during the CDRX Off state, the UE will not receive any downlink PDCCH grants (even though PDCCH grants may be scheduled by the eNB) until the next CDRX ON period of the CDRX cycle. Thus, LTE data throughput may be degraded since the UE misses PDCCH grants scheduled for it.

Accordingly, techniques for SRLTE devices in LTE CDRX to avoid missing PDCCH grants and reduce LTE data throughput loss are desirable.

Techniques are provided herein for the UE to reset the drx-inactivity timer after a tune away gap (e.g., when the UE tunes back to the LTE system) and for causing the UE to actively monitor PDCCH (remain awake) for a duration. Thus, the UE may avoid missing any PDCCH grants and LTE data throughput loss may be reduced.

Figure 8:
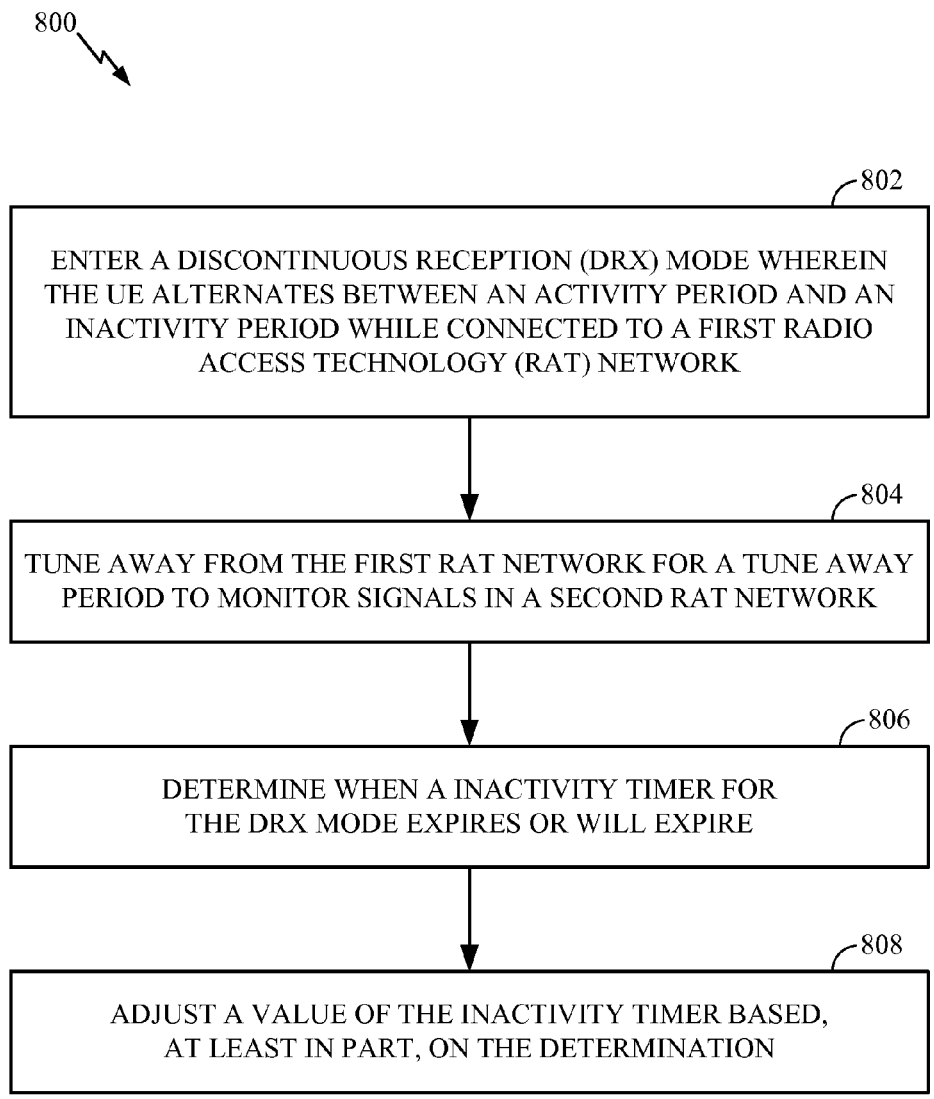
FIG. 8 illustrates example operations for wireless communications, in accordance with certain aspects of the present disclosure.

FIG. 8 illustrates example operations 800 that may be performed for LTE CDRX for SRLTE devices. The operations 800 may be performed, for example, by the UE (e.g., UE 110, which may be an SRLTE UE).

The example operations 800 may begin, at 8002, by entering a discontinuous reception (DRX) mode (e.g., a CDRX mode) wherein the UE alternates between an activity period and an inactivity period while connected to a first RAT network (e.g., an LTE network).

At 804, the UE may tune away from the first RAT network for a tune away period to monitor signals in a second RAT network (e.g., a GSM, 1xRTT, or TD-SCDMA network).

At 806, the UE may determine when an inactivity timer for the DRX mode expires or will expire. AT 808, the UE may adjust a value of the inactivity timer based, at least in part, on the determination.

According to certain aspects, as will be discussed in more detail below regarding FIG. 9, if the UE determines that the activity time expires or will expire during the tune away period (e.g., the tune away gap), then the UE may reset the inactivity timer once it tunes back to the first RAT network. Alternatively, as will be discussed in more detail below regarding FIG. 10, the UE may set the timer to a TCDRX-awake value if the inactivity timer for the DRX mode expires or will expire during or before the tune away period.

Figure 9:
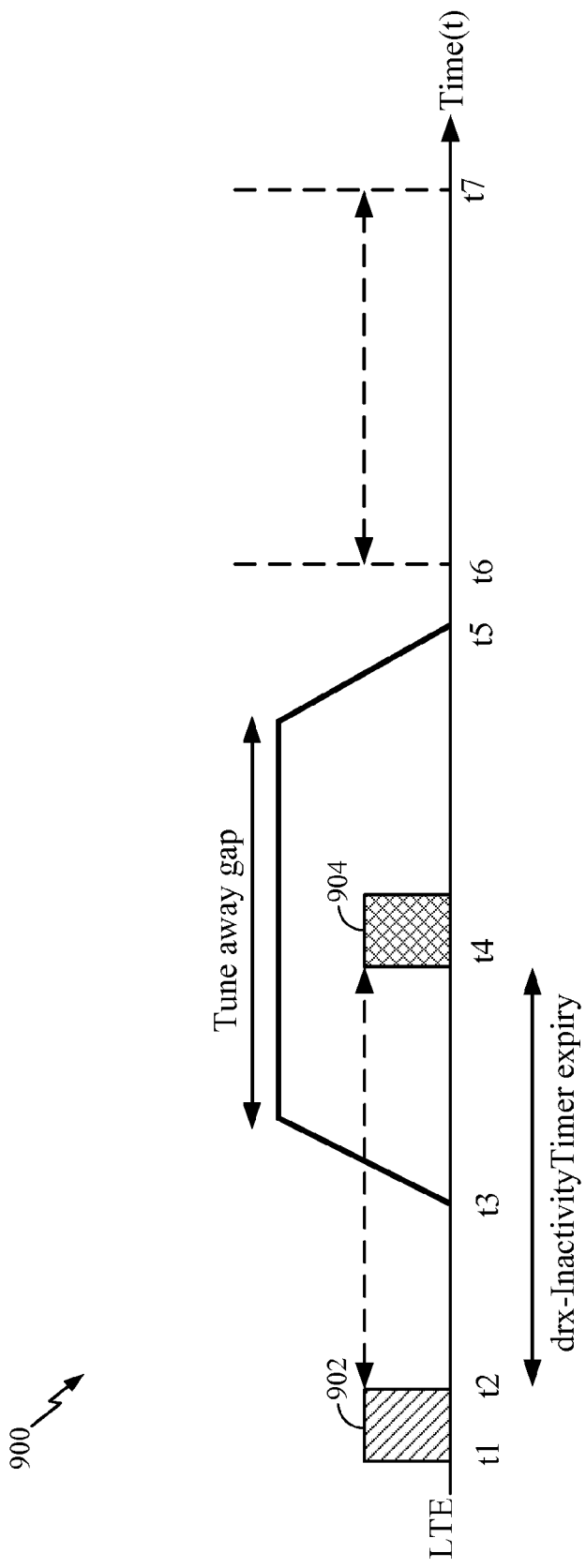
FIG. 9 is an example timeline illustrating tune away during an LTE CDRX cycle and resetting an inactivity time after a tune away gap, in accordance with aspects of the present disclosure.

FIG. 9 is an example timeline 900 illustrating tune away during an LTE CDRX cycle and resetting an inactivity time after a tune away gap, in accordance with aspects of the present disclosure.

As shown in FIG. 9, after successfully decoding the PDCCH 902 in the LTE network, at t1, the UE may initiate the inactivity timer (e.g., the drx-inactivity timer) at t2 and, at t3, the UE may tune away to a different RAT network. As shown in FIG. 9, the inactivity timer may expire during the tune away gap at t4 and fail to decode PDCCH 904 due to the tune away.

According to certain aspects, after the tune away gap, at t5, the UE tunes back to the LTE network and, at t6, the UE may reset the inactivity timer. Thus, instead of entering CDRX OFF state, the UE may remain awake to actively monitor for PDCCH until expiry of the inactivity timer at t7. This may help to avoid the UE missing any downlink PDCCH grants because the UE will be forced to remain awake for a period until expiry of the inactivity timer. Once the inactivity timer expires at t7, the UE may follow the conventional CDRX timeline (e.g., the UE enter the CDRX Off state upon successful PDCCH decoding).

Figure 10:
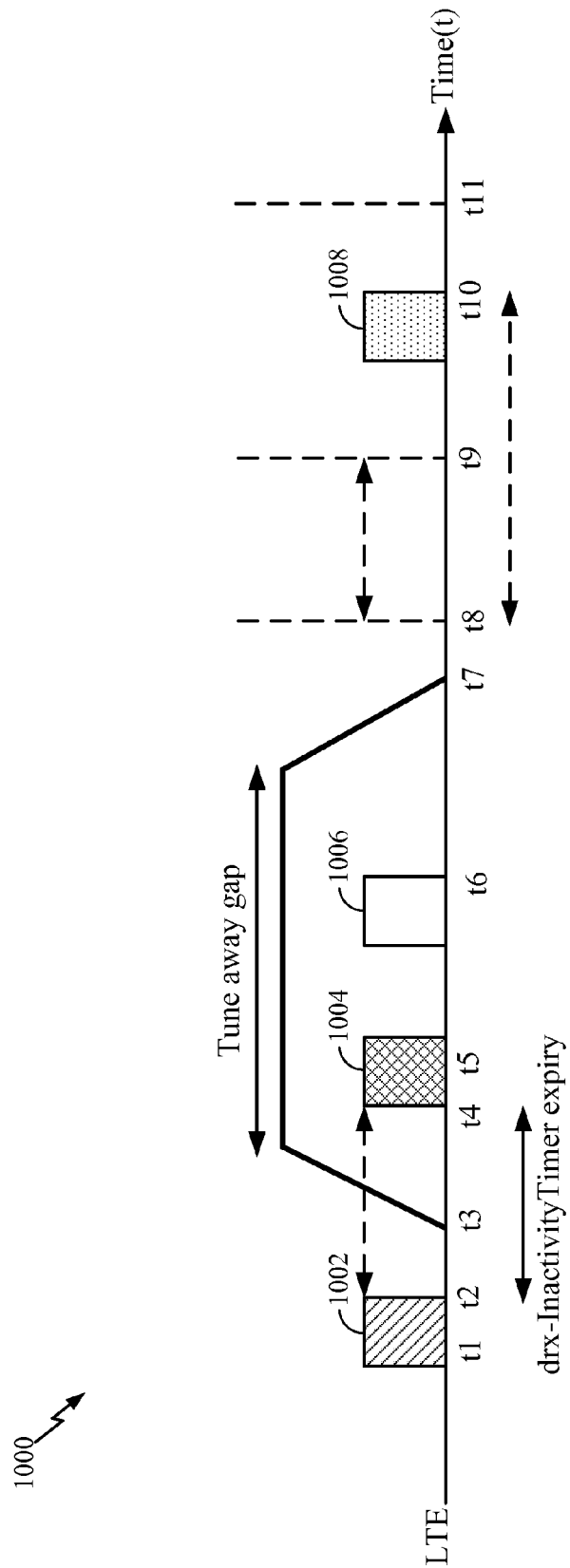
FIG. 10 is an example timeline illustrating tune away during an LTE CDRX cycle and a UE awake period after a tune away gap, in accordance with aspects of the present disclosure.

FIG. 10 is an example timeline 1000 illustrating tune away during an LTE CDRX cycle and a UE awake period after the tune away gap, in accordance with aspects of the present disclosure. According to certain aspects, in a first scenario, the inactivity timer (e.g., drx-inactivity timer) may expire prior to the tune away gap, the UE may enter CDRX sleep (e.g., the CDRX Off state) prior to the tune away gap, and one or more CDRX ON time 1006 collision(s), as shown at t6, may occur within the tune away gap.

Alternatively, as shown in FIG. 10, in a second scenario, the UE may successfully decode PDCCH at t1, initiate the inactivity timer at t2, and tune away from the LTE network at t3. At t4, the inactivity timer may expire during the tune away gap.

According to certain aspects, if either the first scenario or the second scenario occurs, upon exiting the tune away gap, at $t_7$, the UE may remain awake for a time (e.g., a TCDRX-awake time). For example, at t8, the UE may reset the inactivity timer.

In some cases, the value of the inactivity timer may be configurable. For example, the inactivity may be set to a short value (e.g., 20 ms), which may expire at t9, or a long value (e.g., 100 ms), which may expire at tn. The UE may also employ a maximum awake time (e.g., Tawakemax) for the value of the inactivity timer. The default value of the maximum awake time may be set to 50 ms, for example; however, the maximum awake time may be configurable to any value based on various needs or requirements.

A CDRX ON period may occur, at t10, after tuning back to the LTE network at a time equal to the duration of an activity timer (e.g., the onDurationTimer) and an offset for the DRX cycle (e.g., drxcyclestart_offset). According to certain aspects, the maximum awake time may be the short of the short inactivity timer or the end the CDRX ON period, as shown in the following equation:

$$TCDRXawake=\min\{drx-InactivityTimer,(drxcyclestart\_offset+onDurationTimer)\}$$

According to certain aspects, this may ensure that the UE is awake for until expiry of inactivity timer or until the end of the next on duration, whichever is shorter. This may address burst traffic models and a trade-off between UE current consumption and latency.

The enhancements presented herein allow a UE to reset the inactivity timer after tune back to LTE System and causes UE to monitor PDCCH actively. This enhancement avoids UE missing any PDCCH Grants and reduces LTE data throughput losses. As a result, the techniques described herein may help improve LTE data throughput for tune away devices, reduce LTE data session latency after tune back, improve efficiency of LTE downlink performance, and reduce missed downlink signaling by the UE in the period shortly after tune back to LTE.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Figure 8A:
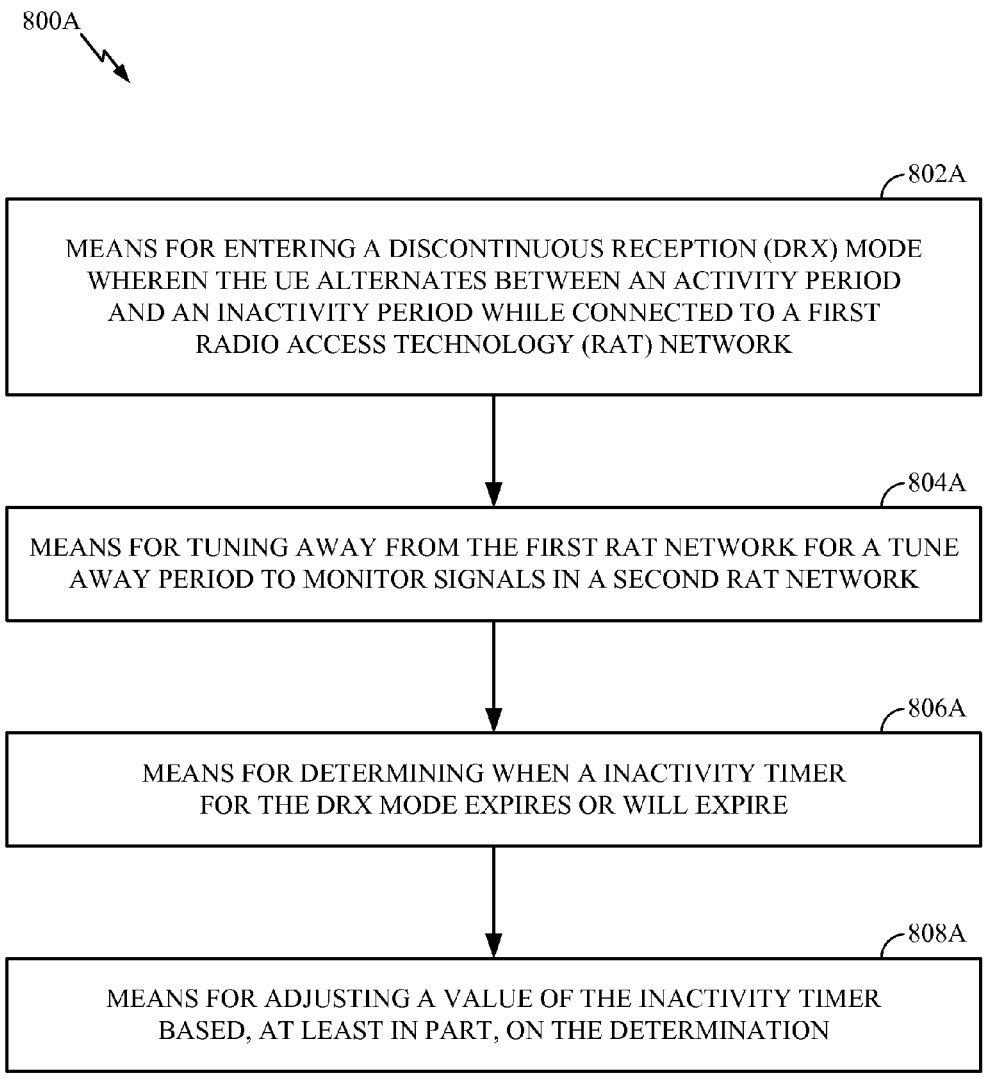
FIG. 8A illustrates example means capable of performing the operations shown in FIG. 8, in accordance with certain aspects of the present disclosure.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 800 illustrated in FIG. 8 correspond to means 800A illustrated in FIG. 8A.

For example, means for transmitting may comprise a transmitter (e.g., the TMTR 222) and/or an antenna(s) 224 of UE 110 or the transmitter (e.g., the transceiver 238) and/or antenna(s) 236 of the eNB 122 illustrated in FIG. 2. Means for receiving may comprise a receiver (e.g., the RCVR 226) and/or an antenna(s) 224 of the UE 110 or the receiver (e.g., the transceiver 222) and/or antenna(s) 236 of the eNB 122 illustrated in FIG. 2. Means for processing, means for determining, means for computing, and/or means for obtaining may comprise a processing system, which may include one or more processors, such as the modem processor 210 of the UE 110 or the controller/processor 240 of the eNB 122 illustrated in FIG. 2.

According to certain aspects, such means may be implemented by processing systems configured to perform the corresponding functions by implementing various algorithms (e.g., in hardware or by executing software instructions). For example, an algorithm for entering a DRX mode wherein the UE alternates between an activity period and an inactivity period while connected to a RAT network, an algorithm for tuning away from the first RAT network for a tune away period to monitor signals in a second RAT network, an algorithm for determining when an inactivity timer for the DRX mode expires or will expire, and an algorithm for adjusting a value of the inactivity timer based, at least in part, on the determination.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, a computer-readable medium may have instructions (e.g., code) stored thereon for entering a DRX mode wherein the UE alternates between an activity period and an inactivity period while connected to a first RAT network, instructions for tuning away from the first RAT network for a tune away period to monitor signals in a second RAT network, instructions for determining when an inactivity timer for the DRX mode expires or will expire, and instructions for adjusting a value of the inactivity timer based, at least in part, on the determination. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
   entering a discontinuous reception (DRX) mode wherein the UE alternates between an activity period and an inactivity period while connected to a first radio access technology (RAT) network;
   tuning away from the first RAT network for a tune away period to monitor signals in a second RAT network;
   determining when an inactivity timer for the DRX mode expires or will expire, wherein the determination comprises a determination that the inactivity timer for the DRX mode expires or will expire during the tune away period; and
   adjusting a value of the inactivity timer based, at least in part, on the determination.

2. The method of claim 1, wherein the first RAT network comprises a long term evolution (LTE) network.

3. The method of claim 1, wherein the second RAT network comprises at least one of: a global system for mobile communications (GSM), 1×RTT, time division synchronous code division multiple access (TD-SCDMA) network, or wideband CDMA (WCDMA).

4. The method of claim 1, wherein the DRX mode comprises a radio resource control (RRC) connected state DRX (CDRX) mode.

5. The method of claim 1, wherein:
adjusting the value of the inactivity timer comprises resetting the value of the inactivity timer to an initial value, a default value, or a predetermined value when the UE tunes back to the first RAT network after the tune away period.

6. The method of claim 1, wherein:
adjusting the value of the inactivity timer comprises setting the value of the inactivity timer to a TCDRX-awake value.

7. The method of claim 6, wherein the TCDRXawake value is less than a threshold value for the TCDRXawake value.

8. The method of claim 7, wherein the TCDRXawake value is equal to a minimum of the inactivity timer or a sum of a value of an offset and a value of another timer.

9. The method of claim 8, wherein the value of the offset comprises a drxcyclestart_offset value and the value of the another timer comprises a value of an onDuration timer.

10. An apparatus for wireless communications by a user equipment (UE), comprising:
means for entering a discontinuous reception (DRX) mode wherein the UE alternates between an activity period and an inactivity period while connected to a first radio access technology (RAT) network;
means for tuning away from the first RAT network for a tune away period to monitor signals in a second RAT network;
means for determining when an inactivity timer for the DRX mode expires or will expire, wherein the determination comprises a determination that the inactivity timer for the DRX mode expires or will expire during the tune away period; and
means for adjusting a value of the inactivity timer based, at least in part, on the determination.

11. The apparatus of claim 10, wherein the first RAT network comprises a long term evolution (LTE) network.

12. The apparatus of claim 10, wherein the second RAT network comprises at least one of: a global system for mobile communications (GSM), 1×RTT, time division synchronous code division multiple access (TD-SCDMA) network, or wideband CDMA (WCDMA).

13. The apparatus of claim 10, wherein the DRX mode comprises a radio resource control (RRC) connected state DRX (CDRX) mode.

14. The apparatus of claim 10, wherein:
adjusting the value of the inactivity timer comprises resetting the value of the inactivity timer to an initial value, a default value, or a predetermined value when the UE tunes back to the first RAT network after the tune away period.

15. The apparatus of claim 10, wherein:
adjusting the value of the inactivity timer comprises setting the value of the inactivity timer to a TCDRX-awake value.

16. The apparatus of claim 15, wherein the TCDRXawake value is less than a threshold value for the TCDRXawake value.

17. The apparatus of claim 16, wherein the TCDRXawake value is equal to a minimum of the inactivity timer or a sum of a value of an offset and a value of another timer.

18. The apparatus of claim 17, wherein the value of the offset comprises a drxcyclestart_offset value and the value of the another timer comprises a value of an onDuration timer.

19. An apparatus for wireless communications by a user equipment (UE), comprising:
at least one processor configured to:
enter a discontinuous reception (DRX) mode wherein the UE alternates between an activity period and an inactivity period while connected to a first radio access technology (RAT) network;
tune away from the first RAT network for a tune away period to monitor signals in a second RAT network;
determine when an inactivity timer for the DRX mode expires or will expire, wherein the determination comprises a determination that the inactivity timer for the DRX mode expires or will expire during the tune away period; and
adjust a value of the inactivity timer based, at least in part, on the determination; and
a memory coupled with the at least one processor.

20. The apparatus of claim 19, wherein the first RAT network comprises a long term evolution (LTE) network.

21. The apparatus of claim 19, wherein the second RAT network comprises at least one of: a global system for mobile communications (GSM), 1×RTT, time division synchronous code division multiple access (TD-SCDMA) network, or wideband CDMA (WCDMA).

22. The apparatus of claim 19, wherein the DRX mode comprises a radio resource control (RRC) connected state DRX (CDRX) mode.

23. The apparatus of claim 19, wherein:
adjusting the value of the inactivity timer comprises resetting the value of the inactivity timer to an initial value, a default value, or a predetermined value when the UE tunes back to the first RAT network after the tune away period.

24. The apparatus of claim 19, wherein:
adjusting the value of the inactivity timer comprises setting the value of the inactivity timer to a TCDRX-awake value.

25. The apparatus of claim 24, wherein the TCDRXawake value is less than a threshold value for the TCDRXawake value.

26. The apparatus of claim 25, wherein the TCDRXawake value is equal to a minimum of the inactivity timer or a sum of a value of an offset and a value of another timer.

27. The apparatus of claim 26, wherein the value of the offset comprises a drxcyclestart_offset value and the value of the another timer comprises a value of an onDuration timer.

28. A non-transitory computer-readable medium having computer executable code stored thereon for:
entering, by a user equipment (UE), a discontinuous reception (DRX) mode wherein the UE alternates between an activity period and an inactivity period while connected to a first radio access technology (RAT) network;
tuning away from the first RAT network for a tune away period to monitor signals in a second RAT network;
determining when an inactivity timer for the DRX mode expires or will expire, wherein the determination comprises a determination that the inactivity timer for the DRX mode expires or will expire during the tune away period; and
adjusting a value of the inactivity timer based, at least in part, on the determination.

29. The non-transitory computer-readable medium of claim 28, wherein:
adjusting the value of the inactivity timer comprises resetting the value of the inactivity timer to an initial value, a default value, or a predetermined value when the UE tunes back to the first RAT network after the tune away period.

30. The non-transitory computer-readable medium of claim 28, wherein
adjusting the value of the inactivity timer comprises setting the value of the inactivity timer to a TCDRX-awake value.

* * * * *